No. 743,539.

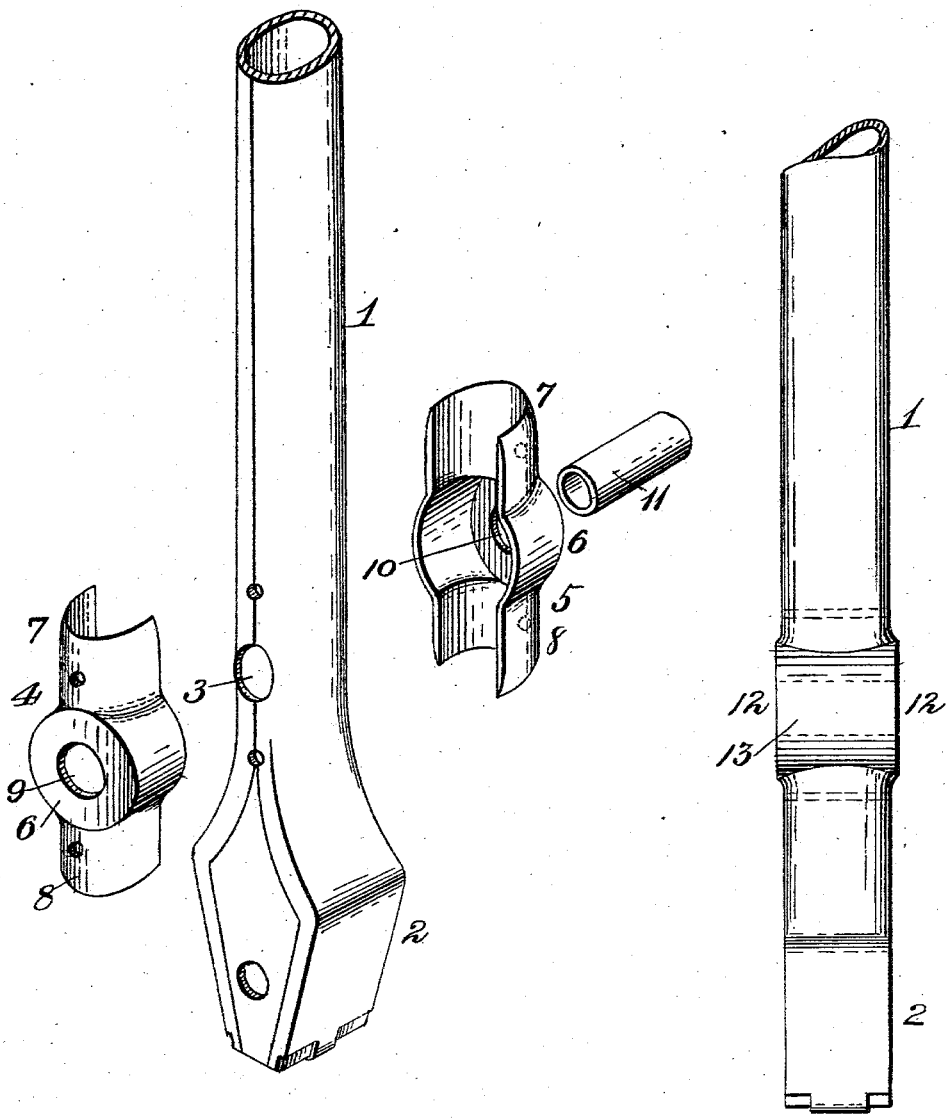

Patented November 10, 1903.

UNITED STATES PATENT OFFICE.

THOMAS MIDGLEY, OF COLUMBUS, OHIO, ASSIGNOR TO THE MIDGLEY MANUFACTURING COMPANY, OF COLUMBUS, OHIO, A CORPORATION OF OHIO.

METALLIC SPOKE FOR VEHICLE-WHEELS.

SPECIFICATION forming part of Letters Patent No. 743,539, dated November 10, 1903.

Application filed March 23, 1903. Serial No. 149,178. (No model.)

*To all whom it may concern:*

Be it known that I, THOMAS MIDGLEY, a citizen of the United States, residing at Columbus, in the county of Franklin and State of Ohio, have invented certain new and useful Improvements in Metallic Spokes for Vehicle-Wheels; and I do hereby declare the following to be a full, clear, and exact description of the invention, such as will enable others skilled in the art to which it appertains to make and use the same.

My invention relates, primarily, to vehicle-wheels, has especial reference to metallic spokes for such wheels, has for its object to provide means for supporting a sprocket-wheel or brake-band, and the invention consists in certain improvements in construction, which will be fully disclosed in the following specification and claims.

In the accompanying drawings, which form part of this specification, Figure 1 is a perspective of a spoke, showing the clips and the tubular reinforce detached; and Fig. 2 is a side elevation of a completed spoke.

Reference being had to the drawings and the designating characters thereon, 1 indicates a tubular metallic spoke having a head 2, which is engaged by the flanges of a hub, or it may be of any other preferred form.

In the spoke, and in this instance adjacent to the head, is a transverse opening 3.

To form a support for a sprocket-wheel or brake-band, opposite or right and left metallic clips or reinforces 4 5, having enlarged circular seats 6 and necks or extensions 7 8, are provided, which are assembled on the spoke with their openings 9 10 in line with the transverse opening 3 in the spoke and secured thereto with pins or wire (not shown) to hold the clips in proper position on the spoke so that the adjacent edges meet, while the spoke, with its clips, is dipped into a bath of molten brazing metal and all the parts are metallically joined together.

A tubular reinforce 11 is inserted in the openings in the spoke and in the clips and passes through the spoke and the clips to receive a bolt for securing a sprocket-wheel or brake-band to the spoke. The reinforce 11 is inserted before the spoke is dipped in the molten metal, so that it is also metallically joined to the spoke and the clips.

After the clips have been joined thereto and made an inseparable part of the spoke the spoke is subjected to emery-wheels and the surfaces ground off and polished, so that the clips have the appearance of having been formed integral with the spoke.

The clips are formed in suitable dies, and after having been attached to the spokes the seats or bearings 12 on opposite sides of the spoke project beyond the edges of the spoke, as shown in Fig. 2, to prevent the sprocket-wheel or brake-band from engaging the spoke beyond said seat, and the completed spoke is provided with a transverse opening 13. (Shown in dotted lines in Fig. 2.)

Having thus fully described my invention, what I claim is—

1. A tubular metallic spoke having seats on opposite sides adjacent to the inner end of the spoke, formed by a clip metallically joined to the spoke.

2. A tubular metallic spoke having an external clip or reinforce provided with seats and metallically joined to the spoke.

3. A tubular metallic spoke having an external reinforce provided with seats on opposite sides of the spoke, and a tubular reinforce extending transversely through the spoke and said reinforce, said reinforces being metallically joined to the spoke.

In testimony whereof I affix my signature in presence of two witnesses.

THOMAS MIDGLEY.

Witnesses:
P. J. CULL,
FRANK P. ILLSLEY.